April 12, 1932.  B. DICK  1,853,963

VEHICLE BRAKE

Filed July 11, 1928

Inventor
Burns Dick
By E. E. Huffman
Att'y.

Patented Apr. 12, 1932

1,853,963

UNITED STATES PATENT OFFICE

BURNS DICK, OF ST. LOUIS, MISSOURI, ASSIGNOR TO WAGNER ELECTRIC CORPORATION, OF ST. LOUIS, MISSOURI, A CORPORATION OF DELAWARE

VEHICLE BRAKE

Application filed July 11, 1928. Serial No. 291,721.

My invention relates to means for preventing motor vehicle brakes from producing, upon application, the noises which are commonly referred to as "chatters" and "squeaks" or "squeals", and it is particularly useful in brakes of the internal type which seem to be more subject to this condition than others. While a variety of causes may produce squeaks and chatters in brakes it is known that among these are the characteristics of the brake lining and its manner of contact with the drum; the condition of the drum surface; and the presence of dust or other foreign material on the braking surface of the drum. To minimize squeaking a drum surface lubricant, such as graphite, has been incorporated in brake linings but has not proven to be continuously effective, possibly for the reason that road dust which soon becomes embedded in the lining either prevents contact of the graphite with the drum or neutralizes its effect. According to my invention herein described means are provided which both serves to discharge road dust, water, or other foreign material from the braking surface of the drum and to maintain a suitable degree of lubrication of that surface.

Figure 1:
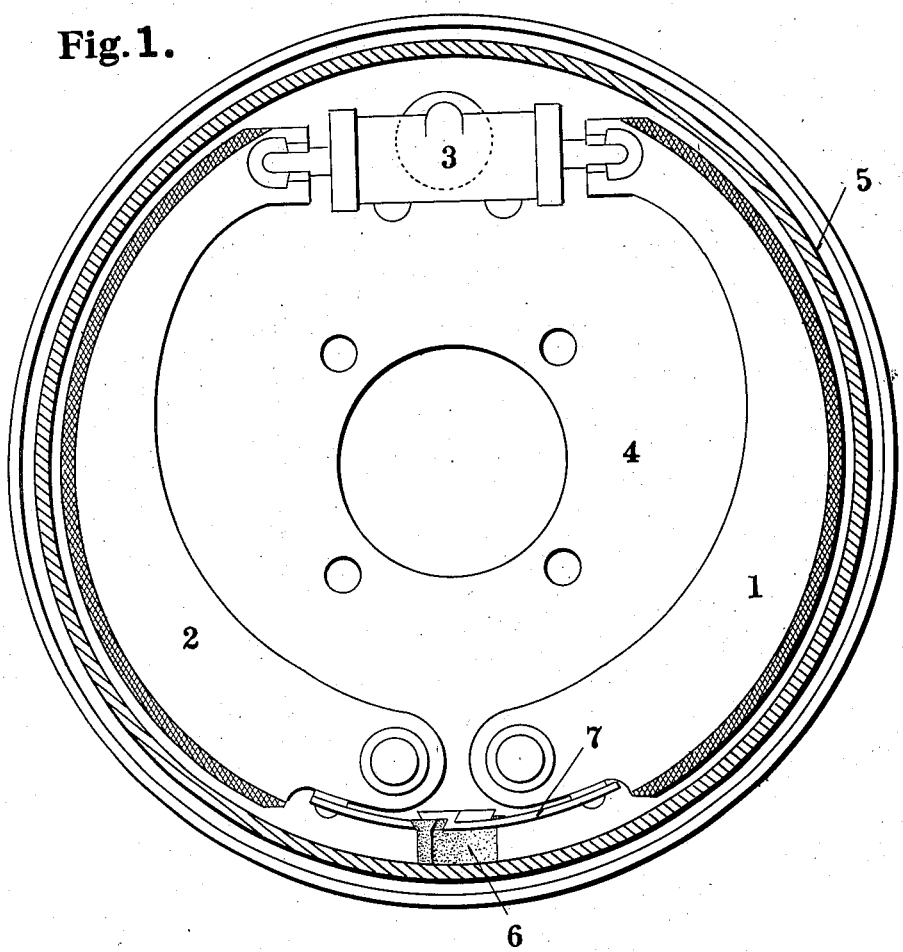
Figure 2:
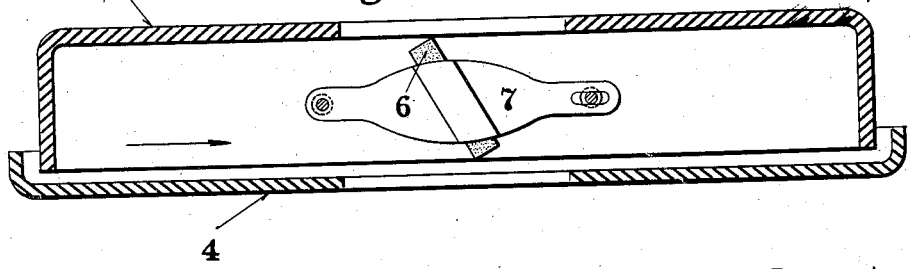

In the accompanying drawings Figure 1 is an elevational view illustrating a two-shoe internal braking apparatus with one embodiment of my invention applied thereto, and Figure 2 is a horizontal sectional view illustrating my squeak preventing means in plan view and in its relation to the brake drum, the brake shoes being omitted from the figure.

Referring to Figure 1, the brake shoes 1 and 2, actuated by any suitable mechanical or hydraulic means, the latter being diagrammatically indicated at 3, are pivotally mounted on the supporting plate 4, which plate is usually extended to form a closure for one side of the drum 5, as indicated in Figure 2. The drum is secured to a vehicle wheel and the shoe supporting member to a non-rotating part of the vehicle in any suitable known manner, which features have not been illustrated since they form no part of my invention.

To secure the object of my invention I provide means contacting with the braking surface of the drum engaged by the lining on the brake shoes, and which is adapted both to apply suitable lubricating material to this braking surface and also to discharge therefrom road dust, water and other foreign material which may be deposited on this surface during the operation of the vehicle. These means comprise, in the embodiment of my invention as shown in the drawings, an elongated brush member 6 mounted on a strip of resilient material 7 attached at its ends to the brake shoes, as shown. This brush is preferably formed of one or more materials at least one of which constitutes a suitable lubricant, such as graphite. I have found that a known commercial type of brush used in dynamo electric machinery which is formed of a combination of graphite and bakelite, appears to produce satisfactory results from the standpoint of wear and the transference, as the result of the moving contact of the braking surface with the brush, of sufficient lubricating film to prevent the delevopment of squeaks upon application of the brake shoes. The brush extends across the braking surface of the drum at an acute angle to the direction of motion of this surface past the brush, the position of the edge of the brush with respect to direction of motion of the drum being such as to cause dust or other foreign material on the drum surface to be discharged over the open edge of the drum. The brush is preferably located at the lowest point of the drum in order that the discharged material may not be carried back to the drum by air currents as might be the case if the brush were located higher.

The brush is positioned to be held continuously in contact with the drum by the resilience of the mounting member 7 and the degree of this pressure can be adjusted to suitable value for particular conditions as to brush material and amount of lubricant desired. It will of course be understood that the brush may be mounted on the brake shoe supporting plate 4 instead of on the shoes.

Having fully described my invention, what

I claim as new and desire to secure by Letters Patent of the United States is:

1. The combination with braking means comprising a rotating brake member and a friction member coacting therewith, of means independent of said parts and in continuous contact with said rotating brake member for applying lubricating material to the braking surface of the rotating member.

2. The combination with braking means comprising a rotating brake member and a friction member coacting therewith, of an abradable member embodying a non-liquid lubricating material and continuously in frictional contact with the braking surface of the rotating member.

3. The combination with braking means comprising a rotating brake member and a friction member coacting therewith, of a resiliently mounted brush member adapted to bear on the braking surface of the rotating member, said brush embodying a lubricating material transferable to said surface by the frictional contact of the surface therewith.

4. The combination with braking means comprising a rotating brake member and a friction member coacting therewith, of a rigid brush member extending across and continuously in contact with the braking surface of the rotating member and having one side positioned at an angle to the direction of motion of said surface.

5. The combination with braking means comprising a rotating brake member and a friction member coacting therewith, of a rigid brush member extending across and continuously in frictional contact with the braking surface of the rotating member and having one side positioned at an angle to the direction of rotation of said surface, said brush embodying a lubricating material transferable to the braking surface.

6. The combination with braking means comprising a rotating brake drum, of a rigid stationary brush continuously contacting with the braking surface of the drum and located at substantially the lowest part of the drum, said brush having one side positioned at an angle to the direction of motion of the braking surface whereby to discharge therefrom dust and other foreign material thereon.

7. The combination with braking means comprising a rotating brake drum, of a rigid stationary brush continuously contacting with the braking surface of the drum and located at substantially the lowest part of the drum, said brush having one side positioned at an angle to the direction of motion of the braking surface whereby to discharge therefrom dust and other foreign material thereon and embodying a lubricating material transferable to the braking surface by frictional contact.

8. The combination with vehicle braking means comprising a rotating brake drum, a friction member adapted to coact with the inner periphery of said drum, and a stationary plate adjacent to but spaced from the open end of said drum, of means continuously engaging with the braking surface of the drum and adapted during rotation of the drum to intercept dust and other foreign material adhering thereto and to discharge same from the drum into the space between the drum and plate.

9. The combination with vehicle braking means comprising a rotating brake drum, a friction member adapted to coact with the inner periphery of said drum, and a stationary plate adjacent to but spaced from the open end of said drum, of means continuously engaging with the braking surface of the drum and adapted during rotation of the drum to intercept dust and other foreign material adhering thereto and to discharge same from the drum into the space between the drum and plate, said means comprising a stationary brush member continuously in contact with the braking surface of the drum and composed of abradable material embodying a lubricant.

10. The combination with braking means comprising a rotating brake drum and a friction member coacting therewith, of means continuously engaging the braking surface of the drum during rotation thereof and having a surface non-adherent to dust and other foreign material and adapted to intercept said dust and foreign material on said braking surface and discharge it from the drum.

In testimony whereof, I hereunto affix my signature, this 9th day of July, 1928.

BURNS DICK.